United States Patent [19]

Tukamoto

[11] 4,393,995
[45] Jul. 19, 1983

[54] EMERGENCY LOCKING TYPE RETRACTOR

[75] Inventor: Masahiro Tukamoto, Fujisawa, Japan

[73] Assignee: Nippon Seiko Kabushiki Kaisha, Tokyo, Japan

[21] Appl. No.: 369,004

[22] Filed: Apr. 16, 1982

[30] Foreign Application Priority Data

Apr. 25, 1981 [JP] Japan .............................. 56-59213[U]

[51] Int. Cl.³ ...................... A62B 35/02; B65H 75/48
[52] U.S. Cl. ......................... 242/107.4 A; 242/107.4 B
[58] Field of Search ................. 242/107.4 B, 107.4 A; 280/806; 297/478

[56] References Cited

U.S. PATENT DOCUMENTS

| | | | |
|---|---|---|---|
| 3,979,083 | 9/1976 | Fohl | 242/107.4 B |
| 4,186,895 | 2/1980 | Burghardt et al. | 242/107.4 B |
| 4,278,216 | 7/1981 | Takada | 242/107.4 A |

Primary Examiner—John M. Jillions
Attorney, Agent, or Firm—Shapiro and Shapiro

[57] ABSTRACT

An emergency locking type retractor has a retractor base, a take-up reel rotatably supported by the retractor base, locking means provided in the retractor base, a latch member, a guide member, a biasing member for urging the latch member towards axially outward direction, a ratchet wheel, a first ratchet movably mounted on the ratchet wheel, an inertia member, a latch portion for engagement with the first ratchet, and a vehicle sensing mechanism having a second ratchet. The retractor is designed such that when rotation of the ratchet wheel is stopped by the first ratchet or the second ratchet, the latch member is caused to slide axially by a cam portion of the ratchet wheel and is led by the guide member to a position in which it is engaged with the locking means, whereby the rotation of the take-up reel in webbing draw-out direction is locked.

5 Claims, 8 Drawing Figures

EMERGENCY LOCKING TYPE RETRACTOR

BACKGROUND OF THE INVENTION

1. Field of the Invention

This invention relates to a so-called dual type emergency locking retractor which senses a vehicle body acceleration or deceleration exceeding a predetermined value and a webbing draw-out speed exceeding a predetermined value to thereby lock the draw-out of webbing.

2. Description of the Prior Art

Various retractors of this type have heretofore been proposed, but many of them have suffered from problems in complexity of mechanism, number of parts and quickness of operation from sensing to locking. A retractor of the type in which an inertia member for sensing the webbing draw-out speed moves axially of the take-up reel as well to lock the shaft has also been proposed, but such retractor may be affected by the acceleration or deceleration of the vehicle depending on the angle at which the retractor is mounted to the vehicle body, whereby an error may be caused to the sensing performance of the inertia member. These problems may affect the weight and cost of the retractor, and are not preferable from the viewpoint of safely restraining the seat occupant by locking the webbing without permitting any excessive stretch-out of the webbing during emergency or may hamper the reliability of operation.

SUMMARY OF THE INVENTION

It is therefore an object of the present invention to provide a dual type emergency locking retractor having a mechanism which solves these problems.

The invention will become fully apparent from the following detailed description of an embodiment thereof taken in conjunction with the accompanying drawings.

DESCRIPTION OF THE PREFERRED EMBODIMENT

Figure 1:
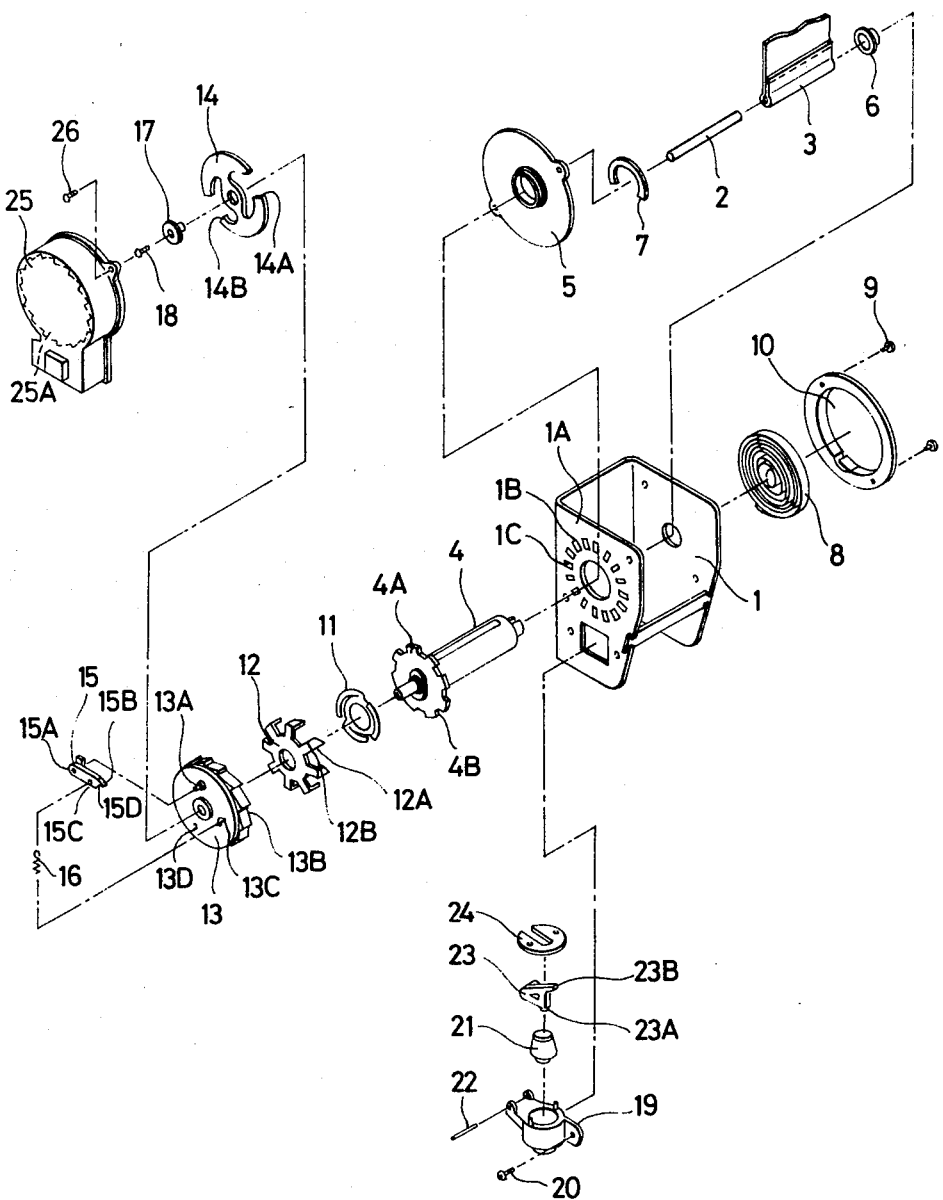
FIG. 1 is an exploded perspective view of an embodiment of the present invention.

Referring to FIG. 1, a base 1 has a bottom surface portion and a pair of opposed side plate portions vertically upstanding from the opposite edges of the bottom surface portion, these side plate portions being formed with through-holes in opposed relationship. In the through-holes, a take-up reel 14 is rotatably mounted by the base 1 through left and right take-up bearings 5 and 6 and a snap ring 7, to which webbing 3 is fastened through a shaft 2. A plurality of (in the figure, sixteen) locking holes 1B equally spaced apart from one another are formed around the through-hole in one side plate portion 1A of the base 1, and the clockwise rotation side of these holes 1B provides a latch surface 1C. On that end of the take-up reel 4 which is adjacent to the side plate portion 1A, a guide plate 4A is mounted for rotation therewith, and a plurality of (in the figure, eight) latch tooth guides 4B equally spaced apart from one another are formed on the outer periphery of the guide plate 4A. The inner end of a take-up spring 8 is secured to the opposite end of the take-up reel 4 and the outer end of the take-up spring 8 is secured to the inner wall of a spring cover 10 secured to the side plate portion of the base 1 by bolts 9. Thus, the take-up reel 4 is biased counter-clockwisely so that the webbing 3 is taken up.

Figure 2:
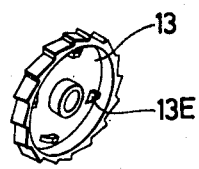
FIG. 2 is a view of a ratchet wheel as seen from the inside thereof.

On that portion of the take-up reel 4 which is outward of the guide plate 4A, a plate spring 11, a latch member 12, a ratchet wheel 13 and an inertia member 14 are loosely mounted in the named order. The latch member 12 is axially slidable and biased toward the outer end of the take-up reel 4 by the plate spring 11 and has a plurality of (in the figure, eight) hook-shaped teeth each having an axially extending portion normally engaged with the latch tooth guide 4B of the guide plate 4A. Each of the teeth has a latch surface 12A and a cam portion 12B on the clockwise rotation side thereof. The ratchet wheel 13 has a latch piece shaft 13A projecting on the outer surface thereof, a tooth portion 13B formed along the outer periphery thereof, a spring hook 13C and an inertia member stopper 13D formed on the outer surface thereof, and a ratchet wheel cam portion 13E formed on the inner surface thereof as shown in FIG. 2. A latch piece 15 having a pivotal fulcrum hole 15A, a latch portion 15B, a spring hook 15C and a cam portion 15D is pivotably fitted on the shaft 13A, and the latch piece 15 is biased clockwisely by a spring 16 extending between and hooked with the spring hooks 13C and 15C.

The inertia member 14 has a cam portion 14A engaged with the cam portion 15D of the latch piece 15, and a portion 14B bearing against the stopper 13D of the ratchet wheel 13.

A stopper plate 17 is fixed to the outermost end of the take-up reel 4 by a bolt 18, whereby the ratchet wheel 13 is prevented from sliding axially outwardly.

A support 19 is fixed to the lower portion of the side plate portion 1A of the base 1 by a bolt 20, and a weight 21 is placed in the hollow of the support 19 and a ratchet lever or latch piece 23 having a projection 23A and a latch portion 23B is pivotally mounted to the support 19 by means of a lever supporting shaft 22. A support cover 24 is further attached to the support 19.

A cover 25 is secured to the side plate portion 1A by bolts 26 so as to cover the above-described members, and a cover latch portion 25A is formed in the inner wall of the cylindrical portion of this cover.

The operation of the embodiment having the above-described construction will now be described by reference to FIGS. 3 to 8.

Figure 3:
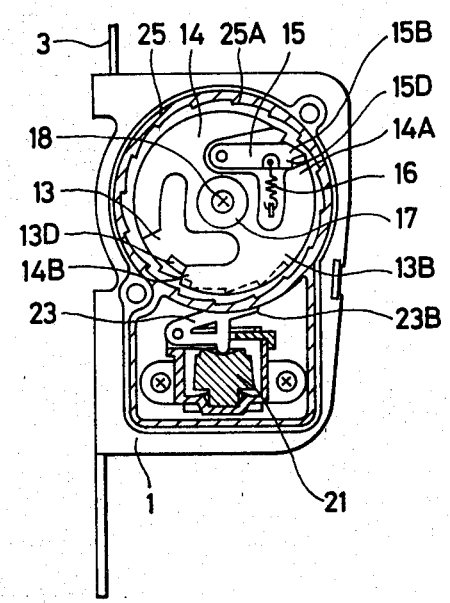
FIGS. 3 and 4 illustrate the operation of this embodiment during the normal state thereof.
Figure 4:
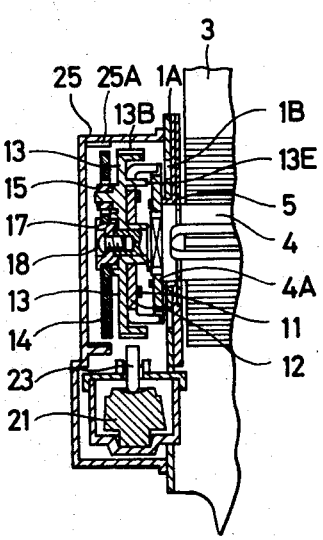

FIG. 3 is a front view showing the normal state and FIG. 4 is a cross-sectional view thereof. In this state, the weight 21 is in its normal upstanding position and accordingly, the ratchet lever 23 is in its downwardly pivoted position with the latch portion 23B being out of engagement with the tooth portion 13B of the ratchet wheel 13.

On the other hand, the inertia member 14 is either rotating with the ratchet wheel 13 or stationary therewith and, by the force of the spring 16, the inertia member 14 is in a position in which the portion 14B thereof bears against the inertia member stopper 13D and the latch piece 15 is in a position in which the cam portion 15D thereof bears against the cam portion 14A of the inertia member 14. Accordingly, the latch portion 15B of the latch piece 15 is out of mesh engagement with the latch portion 25A of the cover 25.

For the reason set forth above, the latch member 12 is normally in engagement with the latch tooth guide 4B of the guide plate 4A and therefore rotates with the take-up reel 4 as a matter of course, and the ratchet wheel 13 also rotates with the take-up reel 4 since there is acting a friction force between the ratchet wheel 13 and the latch member 12 due to the biasing force of the plate spring 11. At this time, the cam portion 13E of the ratchet wheel 13 is between the teeth of the latch member 12.

Thus, normally, the take-up reel 4 is only under the influence of the take-up spring 8, so that if the webbing 3 is manually pulled, it will be drawn out and if the pulling force is released, the webbing 3 will be taken up.

Figure 5:
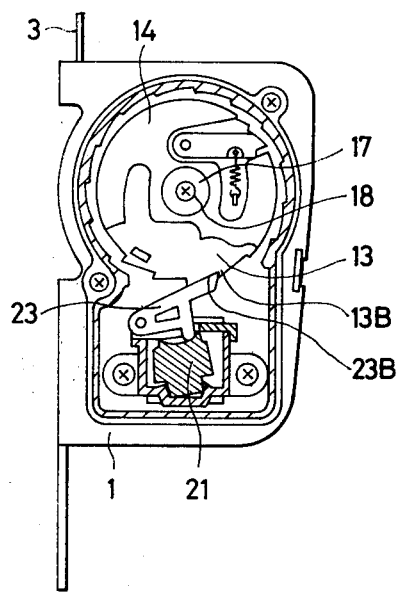
FIGS. 5 and 6 illustrate the operation of the vehicle sensing mechanism in this embodiment.
Figure 6:
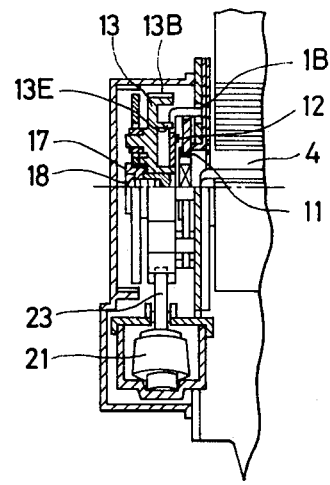

Description will now be made of the operation during an emergency such as a collision. Reference is first had to FIGS. 5 and 6 to describe the operation of a vehicle acceleration-deceleration sensing mechanism. If an acceleration or a deceleration exceeding a predetermined value is imparted to the vehicle body, the weight 21 will become inclined and accordingly, the ratchet lever 23 having its projection 23A placed in the top recess of the weight 21 will pivot upwardly. Simultaneously therewith, the webbing 3 will extend out and the take-up reel 4, the ratchet wheel 13, etc. will rotate clockwisely and therefore, the latch portion 23B of the ratchet lever 23 and the tooth portion 13B of the ratchet wheel 13 will be latched with each other, thereby stopping rotation of the ratchet wheel 13. However, the take-up reel 4 and the latch member 12 will further rotate and therefore, a phase difference will arise between the cam portion 13E of the ratchet wheel 13 and the cam portion 12B of the latch member 12, and the latch member 12 will slide axially inwardly along the latch tooth guide 4B against the force of the plate spring 11. At this time, the ratchet wheel 13 is subjected to an axially outward reaction force, but it will not be moved because the stopper plate 17 is fixed to the take-up reel 4 by the bolt 18. Thus, the teeth of the latch member 12 will come into the holes 1B of the side plate portion 1A and the latch surface 12A and the latch surface 1C of the hole 1B will be latched with each other, whereby rotation of the latch member 12 will be prevented and accordingly, rotation of the take-up reel will be stopped.

The ends of the teeth of the latch member 12 are formed into inclined surfaces facing the counter-clockwise rotation side so as to ensure smooth engagement and disengagement between the latch member 12 and the holes 1B, and the number of the holes 1B is an integer times (in the present example, twice) the number of teeth of the latch member 12. Also, in order that operation may be effected smoothly, quickly and reliably from the latch between the tooth portion 13B of the ratchet wheel 13 and the latch portion 23B of the ratchet lever 23 to the latch between the latch member 12 and the holes 1B, the mechanism comprising these members is synchronized.

Figure 7:
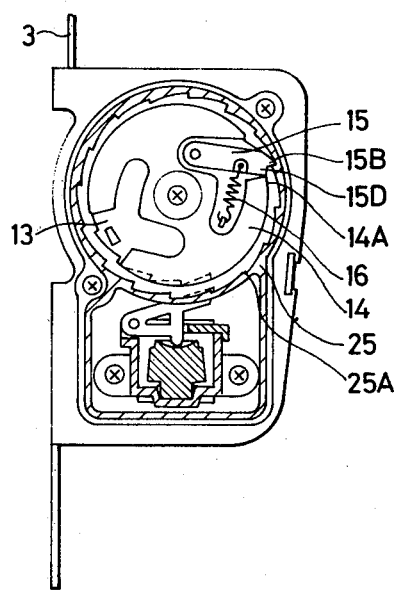
FIGS. 7 and 8 illustrate the operation of the webbing sensing mechanism in this embodiment.
Figure 8:
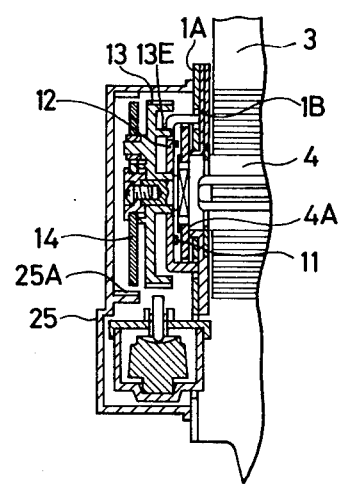

Reference is now had to FIGS. 7 and 8 to describe the operation of the webbing draw-out sensing mechanism. When, during emergency, a force is applied to the seat occupant and the webbing 3 is suddenly drawn out, the take-up reel 4, the ratchet wheel 13, etc. rotate together with each other and due to inertia, the inertia member 14 rotates counter-clockwisely as viewed in FIG. 7 relative to the ratchet wheel 13 against the force of the spring 16. Accordingly, the latch piece 15 pivots counter-clockwisely through the intermediary of the engagement between the inertia member cam portion 14A and the latch piece cam portion 15D, and the latch portion 15B of the latch piece 15 and the latch portion 25A of the cover 25 are latched with each other. Thereby, rotation of the ratchet wheel 13 is stopped. Thereafter, as in the case of the vehicle sensing, the latch member 12 slides axially inwardly until the latch surface 12A thereof and the latch surface 1C of the hole 1B are latched with each other, whereupon rotation of the take-up reel 4 is prevented. Again in this mechanism, synchronization is of course done during the latching.

When the condition returns from the emergency state to the normal state, the position of FIGS. 3 and 4 is again restored and the rotation of the take-up reel 4 in the draw-out and take-up directions takes place in the manner as described in connection with the normal state.

In the present embodiment, the holes 1B which are through-holes may be changed into depressions or projections, the tooth portion 13B on the outer peripheral surface may be changed into a face gear-like tooth portion formed on the end surface of the ratchet wheel or into a level gear-like tooth portion formed on the conical outer peripheral surface in accordance with the mounting angle of the retractor, and the guide plate 4A may be formed integrally with the take-up reel 4. Also, if the locking mechanism is all disposed outside the side wall of the base as in the present embodiment, there will be nothing which will limit the amount of winding of the webbing.

According to the present invention, as has been described above, a part of the vehicle sensing mechanism and a part of the webbing sensing mechanism are made common to each other and therefore, the number of parts is relatively small, and the inertia member is axially immovable and this leads to the provision of a dual type sensing emergency locking retractor in which the operation from sensing to locking is effected quickly and reliably and moreover, rotation of the take-up reel is prevented by a number of engaging portions utilizing the side wall of the base and this leads to compactness and light weight of the load members and accordingly of the retractor.

I claim:

1. An emergency locking type retractor having a retractor base; a take-up reel to which webbing is fastened and which is rotatably supported by said retractor base while being biased in webbing take-up direction; locking means formed around the portion of said retractor base which supports said take-up reel; a latch member supported by said take-up reel for axial sliding movement between a position in which it is engaged with said locking means and a non-engaging position in which it is not engaged with said locking means, said latch member having an engaging portion and a cam portion; a guide member rotatable with said take-up reel and having a guide portion normally engaged with the engaging portion of said latch member and guiding the movement thereof in the axial direction of said take-up reel; a biasing member for biasing said latch member toward said non-engaging position; a ratchet wheel having a toothed portion and a cam portion engaged with the cam portion of said latch member, said ratchet wheel being loosely fitted on said take-up reel against axial movement; a first latch piece mounted on said ratchet wheel for movement between a first position and a second position and biased toward said first position; an inertia member loosely fitted on said take-up reel for operating said first latch piece; a latch portion secured to said retractor base and engageable with said first latch piece when said latch piece is brought from said first position to said second position by said inertia member rotating relative to said ratchet wheel upon sensing of a webbing draw-out speed exceeding a predetermined value, thereby stopping rotation of said ratchet wheel; and a vehicle sensing mechanism provided on said retractor base, said vehicle sensing mechanism including a second latch piece and means for sensing a vehicle acceleration or deceleration exceeding a predetermined value to thereby bring said second latch piece from a non-engaging position in which it is not engaged with the toothed portion of said ratchet wheel to a position in which it is engaged with said toothed portion, thereby stopping rotation of said ratchet wheel; whereby when rotation of said ratchet wheel is stopped, said latch member is caused to slide axially by the cam portion of said ratchet wheel through the cam portion of said latch member and is brought to a position in which it is engaged with said locking means, so that the rotation of said take-up reel in webbing draw-out direction is locked.

2. The retractor according to claim 1, wherein the engaging portion of said latch member is a plurality of teeth formed circumferentially thereof and equally spaced apart from one another, and said locking means comprises a number of through-holes equal to an integer times as many as the number of teeth of said latch member and formed circumferentially and equally spaced apart from one another.

3. The retractor according to claim 1, wherein said toothed portion of said ratchet wheel is formed on the periphery thereof, and said cam portion thereof is formed on the inside thereof.

4. The retractor according to claim 1, wherein said biasing member is a plate spring sandwiched between said guide member and said latch member.

5. The retractor according to claim 1, wherein said latch portion is formed on the inside of a cover for covering the members on the outer surface of said retractor base, said cover being secured to said base.

* * * * *